United States Patent [19]
Ozawa et al.

[11] Patent Number: 5,445,695
[45] Date of Patent: Aug. 29, 1995

[54] BAND FORMING METHOD

[75] Inventors: Chiaki Ozawa; Motoaki Hosono, both of Kodaira, Japan

[73] Assignee: Bridgestone Corporation, Tokyo, Japan

[21] Appl. No.: 167,068

[22] Filed: Dec. 16, 1993

[30] Foreign Application Priority Data

Dec. 28, 1992 [JP] Japan ................... 4-358735

[51] Int. Cl.⁶ .............................................. B60C 15/02
[52] U.S. Cl. ........................ 156/131; 156/132; 156/135; 156/398; 156/401; 156/403; 156/417
[58] Field of Search .............. 156/131, 132, 401, 403, 156/417, 135, 398

[56] References Cited

U.S. PATENT DOCUMENTS

| | | | |
|---|---|---|---|
| 3,816,218 | 6/1974 | Felten | 156/417 |
| 3,950,212 | 4/1976 | Bullmann | 156/403 |
| 4,614,562 | 9/1986 | Jones | 156/403 |
| 4,705,589 | 11/1987 | Enders | 156/401 |
| 5,264,068 | 11/1993 | Masuda | 156/417 |
| 5,273,599 | 12/1993 | Adachi | 156/131 |
| 5,288,352 | 2/1994 | Miyanaga et al. | 156/132 |

*Primary Examiner*—Michael W. Ball
*Assistant Examiner*—Sam Chuan Yao
*Attorney, Agent, or Firm*—Sughrue, Mion, Zinn, Macpeak & Seas

[57] ABSTRACT

A ring-like band with both ends in which beads are wrapped is formed in the following procedure: A forming drum 11 mounted with a band 1 is expanded up to an intermediate diameter, and right and left bead lock segments 65 are positioned with specified intervals. Then, right and left fingers 54 are positioned outside edge portions 1a in the expanding state. Thus, right and left beads 2 are located at specified positions, and the fingers 54 are contracted to reduce the diameters of the edge portions 1a. Subsequently, the bead lock segments are expanded for supporting the beads 2 together with the edge portions 1a from the inner side. Finally, the bead lock segments 65 are brought close to the forming drum side while the forming drum 11 is expanded to the maximum diameter, and the edge portions 1a are folded by the swelling of folding bladders, to thus wrap the beads 2.

1 Claim, 13 Drawing Sheets

BAND FORMING METHOD

BACKGROUND OF THE INVENTION

The present invention relates to a method of forming a band for a tire, and particularly to a method of folding both edge portions of a ring-like band and assembling beads on both the edge portions of the band, and its apparatus.

As the art related to the present invention, the present inventors have examined such a method of forming a band as shown in FIG. 12.

First, a forming drum 04 expansibly divided is supported by a supporting shaft 03 projecting from a bead ring holder 05 (see FIG. 12(1)). A band 01 is fitted around the forming drum 04, and the forming drum 04 is expanded up to a specified maximum diameter (see FIG. 12(2)).

Then, on both sides of the band 01, the above bead ring holder 05 and the similar bead ring holder 06 are positioned in such a manner as to be coaxial and symmetric with respect to the band 01. Subsequently, bladders 07 and fingers 08 are respectively projected from these bead ring holders 05 and 06 (see FIG. 10(3)).

The bladders 07 are inserted within edge portions 01a of the band 01 extending from the forming drum 04. The fingers 08 expansibly divided in the circumferential direction are first disposed along the outer sides of the edge portions 01a in the expanded states, and subsequently contracted. Consequently, the edge portions 01a are disposed along the shoulder portions of the forming drum 04 and are further reduced in diameter.

Next, the bead ring holders 05 and 06 advance at such positions as to surround the edge portions 01a thus reduced in diameter, and beads 02 held by the bead ring holders 05 and 06 are mounted around the edge portions 01a (see FIG. 10(4)).

The bead ring holders 05 and 06 are separated from the band 01 (see FIG. 12(5)), and thereafter the bladders 07 are swelled while the bead ring holders 05 and 06 are again brought close to the band 01 (see FIG. 12(6)). The edge portions 01a are folded on the bead 02 by the swelled bladders 07, and thus the band 01 is formed such that the beads 02 are wrapped by the edge portions 01a folded as shown in FIG. 12(7).

The above-described band forming method, however, has the following disadvantage:

When a plurality of fingers 08 circumferentially divided are engaged with the edge portions 01a of the band, the center axis of the fingers 08 is sometimes deviated from that of the forming drum. In the event the plurality of fingers 08 are off-center, certain fingers are contacted with the edge portions 01a earlier in time, and other fingers are contacted with the edge portions 01a later in time. Accordingly, when the off-centered fingers 08 are contracted, as shown in FIG. 13, the earlier contacted fingers 08a squeeze the edge portions 01a deeply, and the later contacted fingers 08b squeeze the edge portions 01a less deeply. As a result, there occurs a variation of squeeze amount in the circumferential direction of the band.

Further, since the fingers 08a earlier contacted with the edge portions 01a receive a large reaction force from the band, they are susceptible to deformation, and to significant fatigue. In addition, the area of the edge portions 01a disproportionately squeezed by the fingers 08a tends to generate wrinkling.

In the process shown in FIG. 12(4) in which the beads are mounted around the edge portions 01a, the beads 02 released from the bead ring holders 05 and 06 are not supported from the inner peripheral surface side. Accordingly, the beads 02 tend to be easily moved and are difficult to be stably located at specified positions. Consequently, there is generated a variation in the length of a ply between the right and left beads 02 and 02.

The above-described disadvantages cause variations in the qualities of the bands, which deteriorates the uniformity of a tire.

SUMMARY OF THE INVENTION

Taking the above circumstances into consideration, the present invention on has been made, and an object of the present invention is to provide a method of forming a band capable of improving the uniformity of a tire and its apparatus.

To achieve the above object, according to the present invention, there is provided a method of forming a ring-like band having folded portions where beads are wrapped at both edges comprising: a step of contracting in diameter a forming drum capable of being changed in diameter, and disposing a ring-like band around the forming drum; a step of expanding the forming drum to an intermediate diameter, and supporting the band around the forming drum in such a state that both edge portions of the band project from the forming drum; a step of positioning bead lock segments capable of being changed in diameter at specified axial positions inside of the edge portions; a step of positioning fingers, which are disposed in a cylindrical shape and can be expanded/contracted, at positions outside the edge portions in an expanded state; a step of positioning beads at positions outside the edge portions and corresponding to the bead lock segments; a process of contracting the fingers for reducing diameters of the edge portions; a step of expanding the bead lock segments and supporting the beads together with the edge portions from the inner sides, thereby assembling the beads to the band; a step of expanding the forming drum at a maximum diameter, thereby moving the bead lock segments to the forming drum side while supporting the beads; and a step of swelling a folding bladder and folding the edge portions onto the outer peripheral surface of the band, thereby wrapping the bead.

According to the present invention, the squeeze of the band edge portions by the fingers is performed in the state that the band is expanded in the intermediate diameter, which makes it possible to reduce the squeeze amount, to eliminate the generation of the wrinkling, and to uniformly form the band.

Further, in the present invention, the beads are assembled in the state that the band is expanded in the intermediate diameter, and at this time, there is no difference between the diameter of the band and that of the beads, and further the beads are supported by the bead lock segments from the inner peripheral surface side. Accordingly, it is possible to stably locate the beads at specified positions, and to equalize the band length between the beads on both the sides over the whole circumference. Thus, it is possible to obtain a band which is excellent in unifomity, and hence to improve the uniformity of the tire using the band thus obtained.

DETAILED DESCRIPTION OF THE PREFERRED EMBODIMENTS

One embodiment of the present invention will be described with reference to FIGS. 1 to 11.

Figure 1:
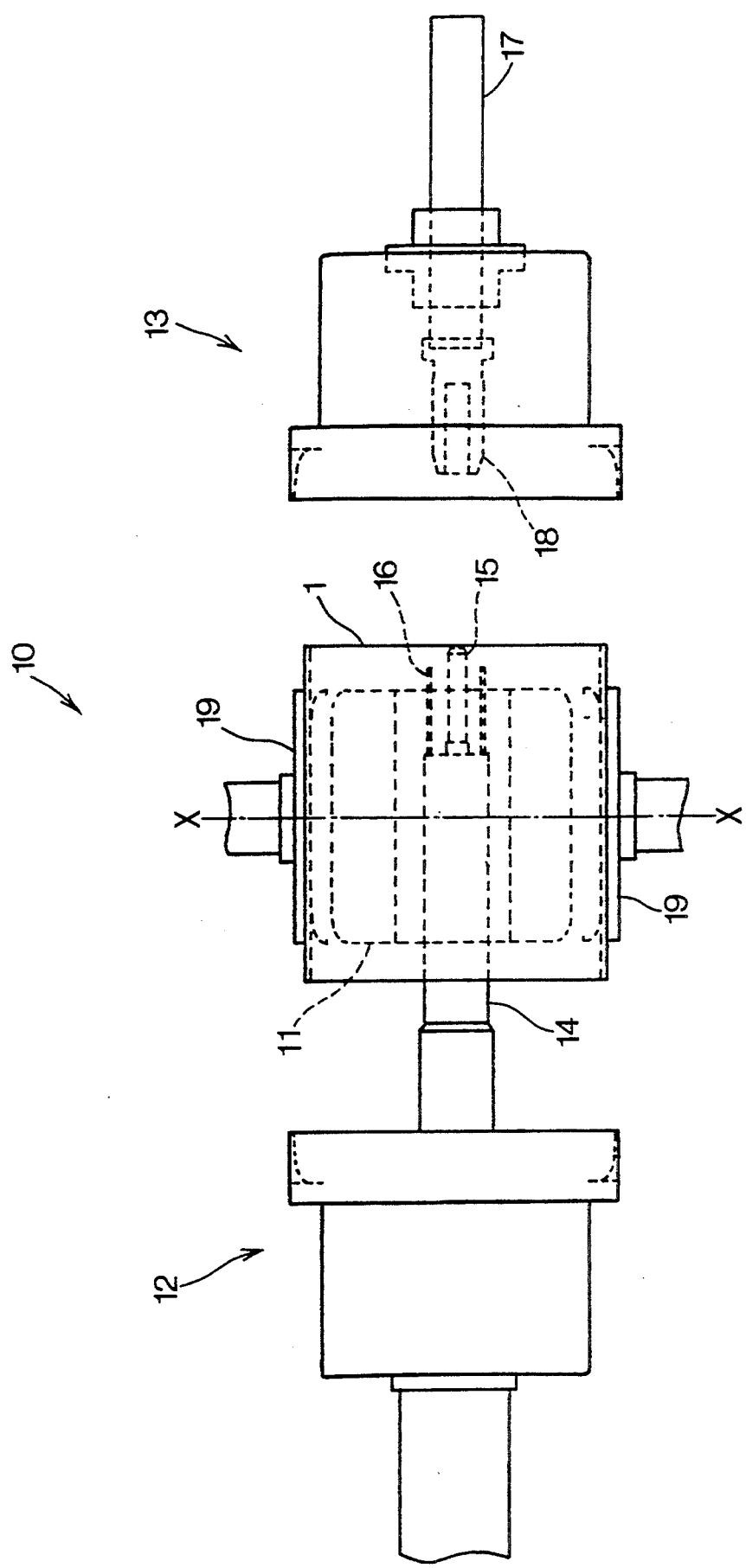
FIG. 1 is a side view of the whole construction of a band forming machine according to one embodiment of the present invention.

FIG. 1 is a side view showing whole construction of a band forming machine 10 according to this embodiment. The band forming machine 10 includes a forming drum 11 disposed at the center, and bead setters 12 and 13 disposed on both sides. The forming drum 11 is supported by a supporting shaft 14 slidably passing through the left side bead setter 12.

The bead setters 12 and 13 are moved along rails extending in parallel to the axis of the forming drum 11 so as to be coaxial to the supporting shaft 14, and which can be brought close to each other while putting the forming drum 11 therebetween. The bead setter 13 can be fitted in the leading edge of the supporting shaft 14.

The forming drum 11 is divided in a plurality of parts so that the diameter can be expanded and contracted. The forming drum 11 shown in FIG. 1 is in the state of being contracted, and a band 1 carried by a band carrying ring 19 is positioned around the outer periphery of the forming drum 11.

FIGS. 2 to 11 show the outline of the internal structures of the right and left bead setters 12 and 13 and their actions.

Figure 2:
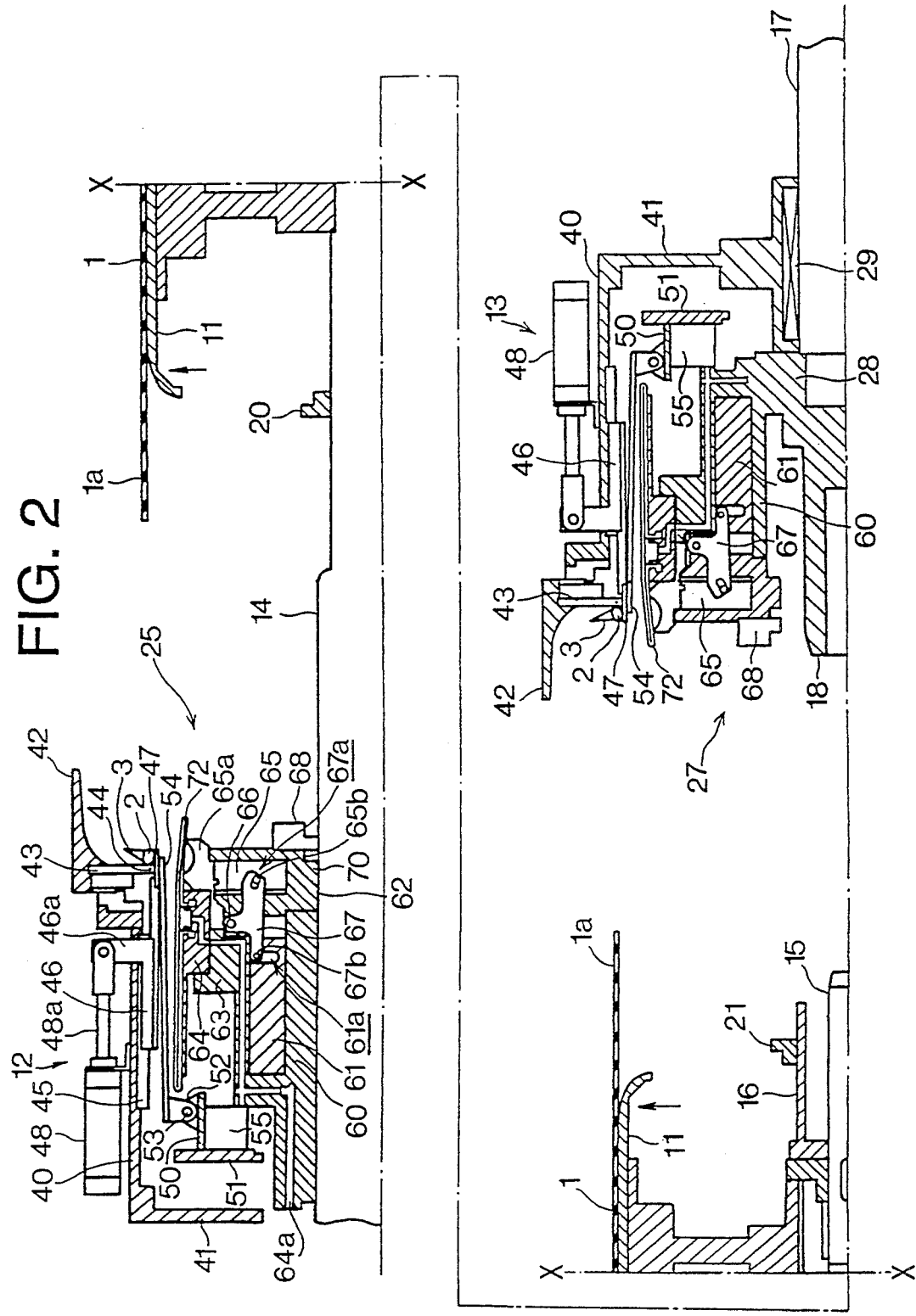
FIG. 2 is a partial side sectional view of the band forming machine showing a stand by state.
Figure 3:
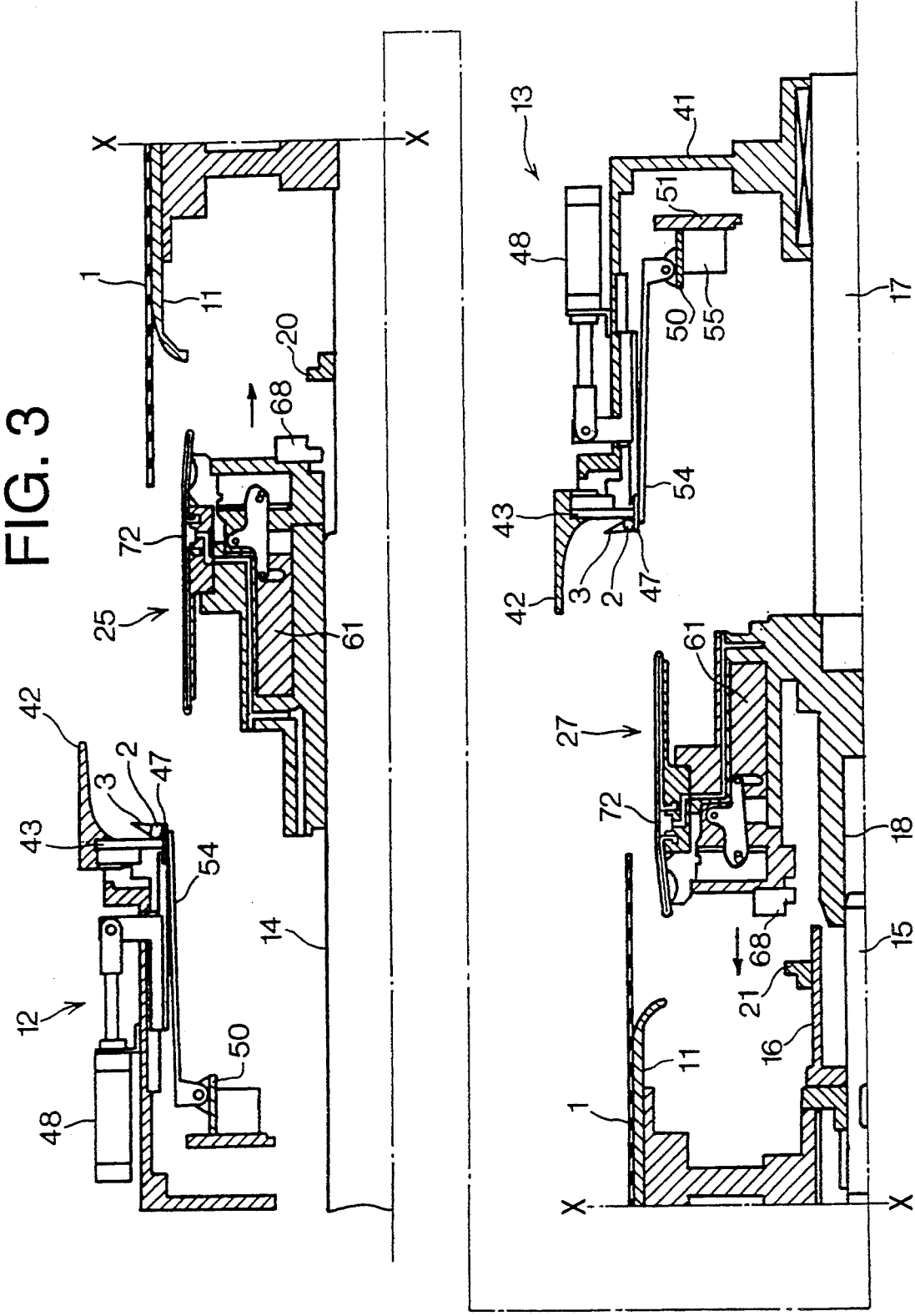
FIG. 3 is a partial side sectional view of the band forming machine showing an advance of the bead lock apparatus.

In FIG. 2, the forming drum 11 is expanded in an intermediate diameter to support the band 1 from the inner side, and the band carrying ring 19 is removed. As for the band 1, the central portion is supported by the forming drum 11, and both edge portions 1a project sideward from the forming drum 11.

At the end portion of the supporting shaft 14 passing through the forming drum 11, a fitting portion is formed. The fitting portion is composed of a small sized leading edge shaft 15 and a cylinder portion 16 which surrounds the leading edge shaft 15 to form a space between the leading edge shaft 15 and the same. On the other hand, at the end portion, opposed to the above fitting portion, of the supporting shaft 17 for supporting the right side bead setter 13, a leading edge shaft 18 is formed. The leading edge shaft 18 is formed in such a cylindrical shape that the inside diameter is substantially equal to the outside diameter of the leading edge shaft 15 and the outside diameter is substantially equal to the inside diameter of the cylinder portion 16. By movement of the supporting shaft 17, the cylindrical leading edge 18 is fitted in the fitting portion of the supporting shaft 14, and thereby the supporting shafts 14 and 17 are coaxially connected to each other.

The bead setters 12 and 13 are symmetrically moved with respect to the center line X—X of the forming drum 11. Bead lock positioning stoppers 20 and 21 are respectively fitted on the supporting shaft 14 and the cylinder portion 16 at the symmetric positions with respect to the center line X—X.

The left bead setter 12 is formed substantially in a cylindrical shape and a bead lock apparatus 25 is fitted on the inner side of the left bead setter 12 so as to freely come in and out. The bead lock apparatus 25 is slidably supported by the supporting shaft 14. The right bead setter 13 is similarly formed in a cylindrical shape, and a bead lock apparatus 27 is fitted on the inner side of the right bead setter 13 so as to freely come in and out. The bead lock apparatus 27 is integrally supported by the supporting shaft 17 through a connecting member 28, and is moved together with the supporting shaft 17. The supporting shaft 17 is slidably supported by the bead setter 13 through a sliding member 29

The bead setters 12 and 13, and the bead lock apparatuses 25 and 27 are symmetrically disposed and have similar structures, respectively. Accordingly, in the following description, the similar parts in the right and left bead setters and bead lock apparatuses are indicated at the same symbols.

The bead setters 12 and 13 are composed of cylinder portions 40, and the end plates 41 having openings at the centers, and the above bead lock apparatus 25 and 27 are fitted within the cylinder portions 40 so as to freely come in and out, respectively.

A pusher can 42 with a diameter larger than that of the cylinder portion 40 is projectingly provided at the edge portion, opposed to the end plate 41, of each cylinder portion 40. The outer peripheral surface of the pusher can 42 is formed in a cylindrical surface, and the inner peripheral surface thereof is formed in a curved surface in which the diameter is gradually enlarged approaching the leading edge.

Bead holders 43 of six pieces are circumferentially disposed in the inner peripheral surface of the pusher can 42 so as to be continuous to each other. As shown in FIG. 2, these bead holders 43 are pivotably supported at their radially outer ends in the postures perpendicular to the supporting shaft 14, so that they can all be rocked and thereby enlarged in inside diameter. A magnet 44 is embedded on the inner end side of each bead holder 43, which attracts steel wires of the bead 2, thus making it possible to attract and hold the bead 2 by the bead holders 43.

Several numbers of rails 45 are provided on the inner peripheral surface of each cylinder portion 40 in parallel to the supporting shaft 14, and a cylinder member 46 is slidably supported on these rails 45. A bead locator ring 47 is projectingly provided at the leading edge of the cylinder member 46.

A projection 46a extends outward from the cylinder member 46 while passing through a groove hole of the cylinder portion 40, and the leading edge of a piston rod 48a of a cylinder 48 fixed on the outer peripheral surface of the cylinder portion 40 is engaged with the projection 46a.

Accordingly, the cylinder member 46 is driven by the cylinder 48 through the projection 46a and is slidably moved in the axial direction, to project or retreat the bead locator ring 47 at the leading edge forwardly or rearwardly of the bead holders 43.

In FIG. 2, the bead holders 43 are contracted in diameter and the bead locator ring 47 are projected forward. An annular bead 2 is fitted and held at an angular portion formed between the bead holders 43 and the bead locator ring 47. The bead 2 has a stiffener 3 fixed thereto.

A finger moving member composed of a finger supporting cylinder 50 and the end plate 51 is axially slidably supported on the inner side of the cylinder portion 40 of each of the bead setters 12 and 13. Bearings 52, for example, of eight pieces, are projectingly provided on the outer peripheral surface of the finger supporting cylinder 50 with equal intervals, and fingers 54 pivotably supported at their base end portions by the bearings 52 through pins 53 extend to the forming drum 11 side along the cylinder member 46.

The fingers 54 are usually energized by coil springs (not shown) in the expanding direction. However, in FIG. 2, since the leading edges of the fingers 54 are abutted on the inner peripheral surface of the bead locator ring 47 to be restricted in the expansion, the fingers 54 are in the contracted state. The end plate 51 is opposed to the end plate 41 of each of the bead setters 12 and 13, and the fingers 54 are capable of being retreated relative to each of the bead setters 12 and 13 until the end plate 51 is contacted with the end plate 41. Further, a stopper 55 is provided on the inner side of the finger supporting cylinder 50, and the fingers 54 advance relative to each of the bead lock apparatuses 25 and 27 until the stopper 55 is abutted on each of the bead lock apparatuses 25 and 27.

The main body portion of each of the bead lock apparatuses 25 and 27 is formed of an annular air cylinder 60, and a bead lock segment supporting portion 62 is integrally provided in front of the main body portion 60. A bladder supporting portion 64 is formed on a flange portion 63 of the air cylinder 60.

The bead lock segment supporting portion 62 is formed in an annular shape, and a plurality of divided bead lock segments 65 are radialy slidably inserted in the grooves opened on the outer peripheral surface of the bead lock segment supporting portion 62. The outer end portion of each bead lock segment 65 functions as a bead supporting portion 65a exposed from the groove. A recessed surface is formed on the outer peripheral surface of the bead supporting portion 65a, so that the bead 2 can be supported by each recessed surface from the inner peripheral side. The shape of the recessed surface is specified according to the sectional shape of the bead used. Each bead supporting portion 65a is exchangeable.

A link member 67 is rockingly (pivotably) supported on the bead lock segment supporting portion 62 through a pin 66. A groove 67a is formed at one end of the link member 67, and a pin 65b projectingly provided on each bead lock segment 65 is engaged with the groove 67a. A pin 67b is provided on the other end of the link member 67, and is slidably engaged with a radial groove 61a formed on the annular piston 61 of the air cylinder 60.

In FIG. 2, the piston 61 is perfectly inserted within the air cylinder 60, and the bead lock segments 65 are also inserted within the bead lock segment supporting portion 62. In such a state, by projecting the piston 61 through the supply of air in the cylinder bore of the air cylinder 60, the link member 67 engaged with the piston 61 through the groove 61a and the pin 67b is rocked around the pin 66, and the bead lock segments 65 engaged with the groove 67a provided at one end of the link member 67 through the pin 65a are all projected radially outwardly, so that the diameter of the bead supporting portion 65a is expanded.

A bead lock stopper 68 is radially slidably supported on the front end surface of the bead lock segment supporting portion 62 so as to be set in its radial portion. When being set at the radially inward portion, the bead rock stopper 68 is opposed to each of the above bead lock positioning stoppers 20 and 21. When each of the bead lock apparatuses 25 and 27 advances, the bead lock stopper 68 is abutted on each of the bead lock positioning stoppers 20 and 21, and thereby each of the bead lock apparatuses 25 and 27 are positioned. When being set in the radially outward position, the bead lock stopper 68 is not abutted on each of the bead lock positioning stoppers 20 and 21. In this case, a siding stopper 70 formed on the inner peripheral surface of the bead lock segment supporting portion so as to be spaced apart from the bead lock stopper 68 with a specified interval in the axial direction is abutted on the bead lock-positioning stoppers 20 and 21, so that each of the bead lock apparatuses 25 and 27 is positioned at the position further advancing from the position specified by the bead lock stopper 68. Thereafter, by movement of the bead lock stopper 68 at a radially inward position, each of the bead lock positioning stoppers 20 and 21 is held from both sides by the bead lock stopper 68 and the siding stopper 70, and accordingly, each of the bead lock apparatuses is fixed at the position and is impossible to be slidably moved in the longitudinal direction.

A folding bladder 72 is supported on the bladder supporting portion 64. When air is supplied in the folding bladder 72 through an air passage 64a, the bladder is swelled and erected. On the other hand, when an air in the bladder 72 is dischanged through the air passage 64a, the bladder is laid down. FIG. 2 shows the laid down state of the folding bladder 72, wherein the bladder 72 is laid down so as to be closely contacted with the outer peripheral surface of the bladder supporting portion 64, and the front portion of the bladder 72 extends up to the outer peripheral surface of the bead supporting portions 65a of the bead lock segments 65.

Hereinafter, the operational procedure of the band forming machine 10 of the present invention will be described with reference to FIGS. 2 to 15.

FIG. 2 shows the stand-by condition. The bead setters 12 and 13, and the bead lock apparatuses 25 and 27 are spaced apart from the forming drum 11. The forming drum 11 is expanded up to the intermediate diameter to support the band 1, and the bead holders 43 and the bead locator rings 47 of the bead setters 12 and 13 support the bead 2.

In such a state, the bead lock apparatus 25 slidingly advances along the supporting shaft 14, and concurrently the bead lock apparatus 27 advances together with the supporting shaft 17. The advancing of the bead lock apparatuses 25 and 27 is stopped at the position where the cylindrical leading edge shaft 18 is partially inserted in the leading edge shaft 15 of the supporting shaft 14 (see FIG. 3).

Next, while the bead setters 12 and 13 are left as they are, the finger supporting cylinder 50 advances by a specified distance. Thus, the portions of the fingers 54 abutted on the locator ring 47 are gradually moved to the base end side of the fingers 54, so that the fingers 54 energized in the expanding direction are expanded.

Figure 4:
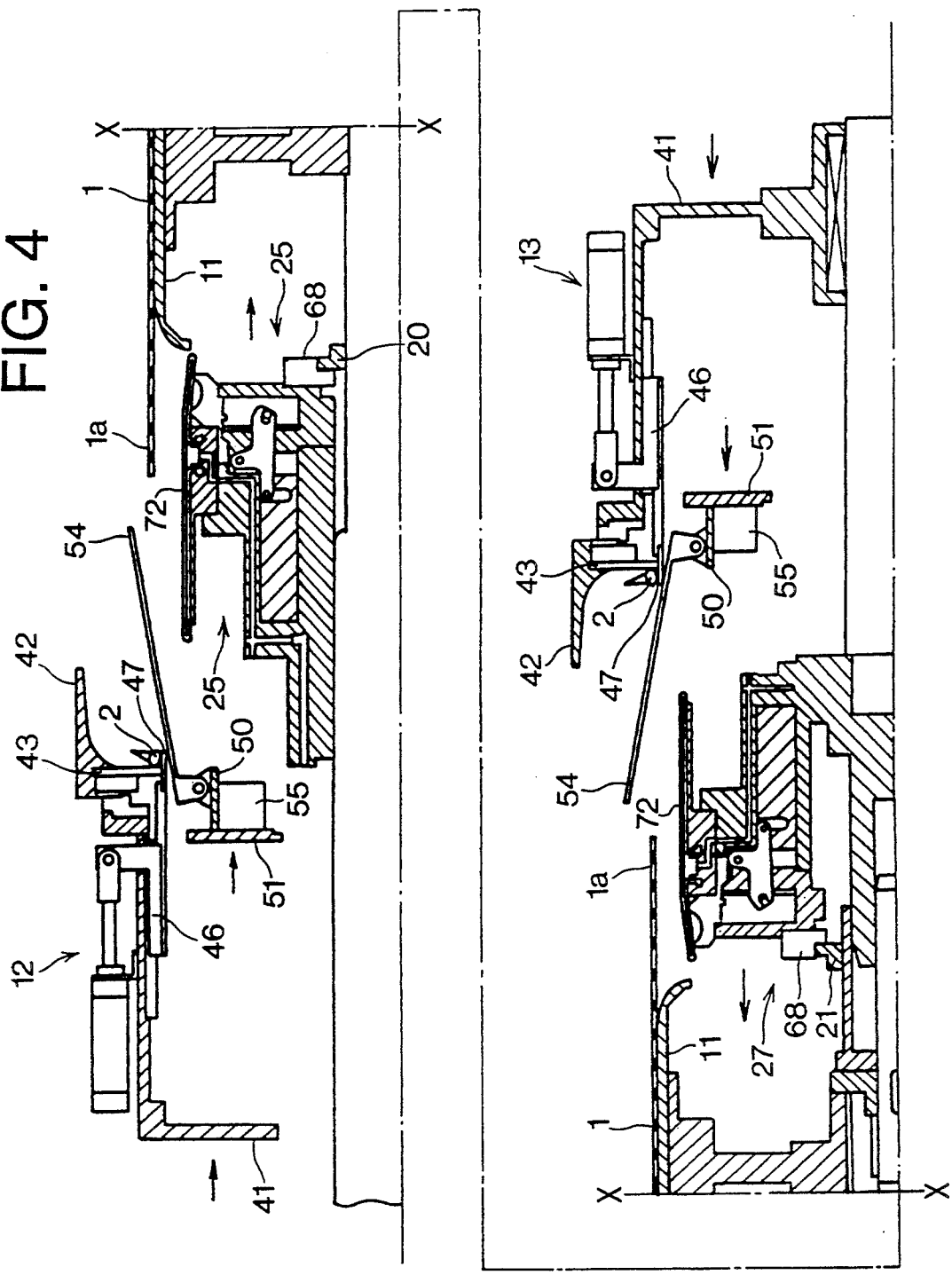
FIG. 4 is a partial side sectional view of the band forming machine showing the bead lock stopper abutting each of the bead lock positioning stoppers, and an advance of the positioning fingers.

While the relative positions between the bead lock apparatuses 25 and 27, the bead setters 12 and 13, and the fingers 54 are held as they are, they further advance as a whole, and are located at positions in which the bead lock stopper 68 is abutted on each of the bead lock positioning stoppers 20 and 21 (see FIG. 4).

Figure 5:
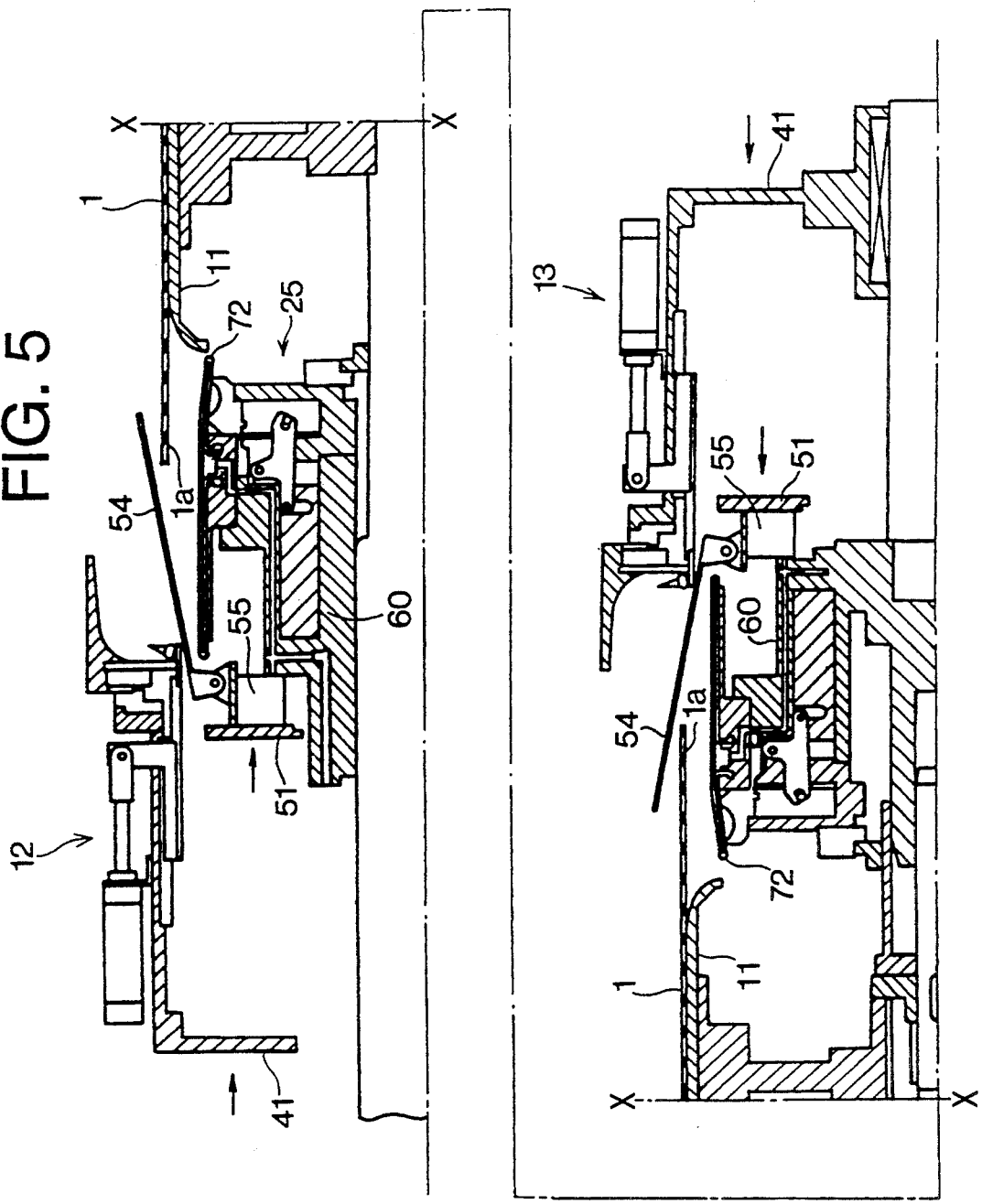
FIG. 5 is a partial side sectional view of the band forming machine showing a further advance of the positioning fingers and the bead holders.

Next, the bead setters 12 and 13 advance together with the fingers 54, and are positioned at the positions where the stopper 55 for fingers 54 is abutted on the air cylinders 60 of each of the bead lock apparatuses 25 and 27 (see FIG. 5). In such a state, the fingers 54 cover the outside of the edge portion 1a of the band 1 supported by the forming drum 11.

Figure 6:
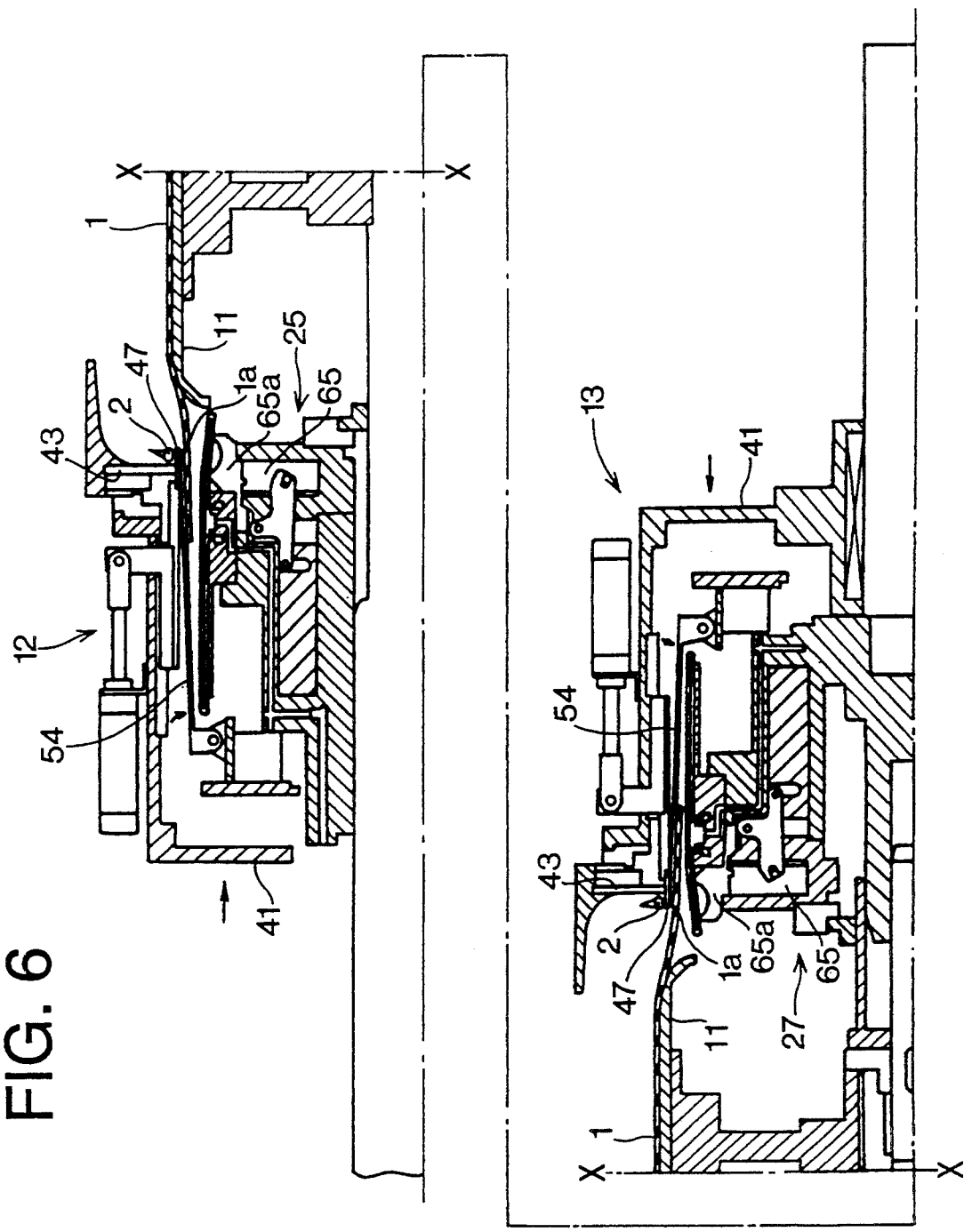
FIG. 6 is a partial side sectional view of the band forming machine showing the fingers squeezing the edge portion of the band.
Figure 7:
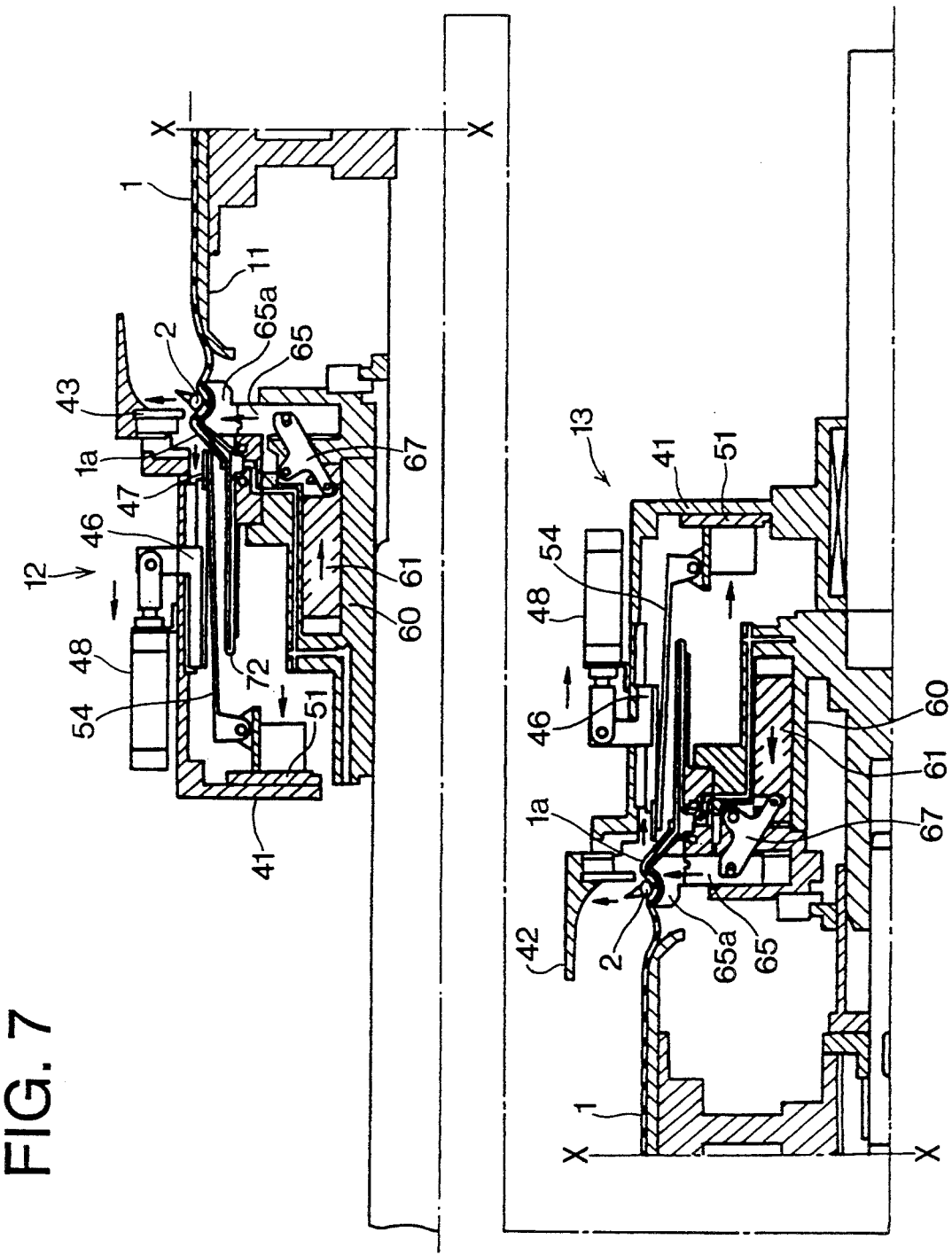
FIG. 7 is a partial side sectional view of the band forming machine showing the bead being supported by the supporting portions.
Figure 8:
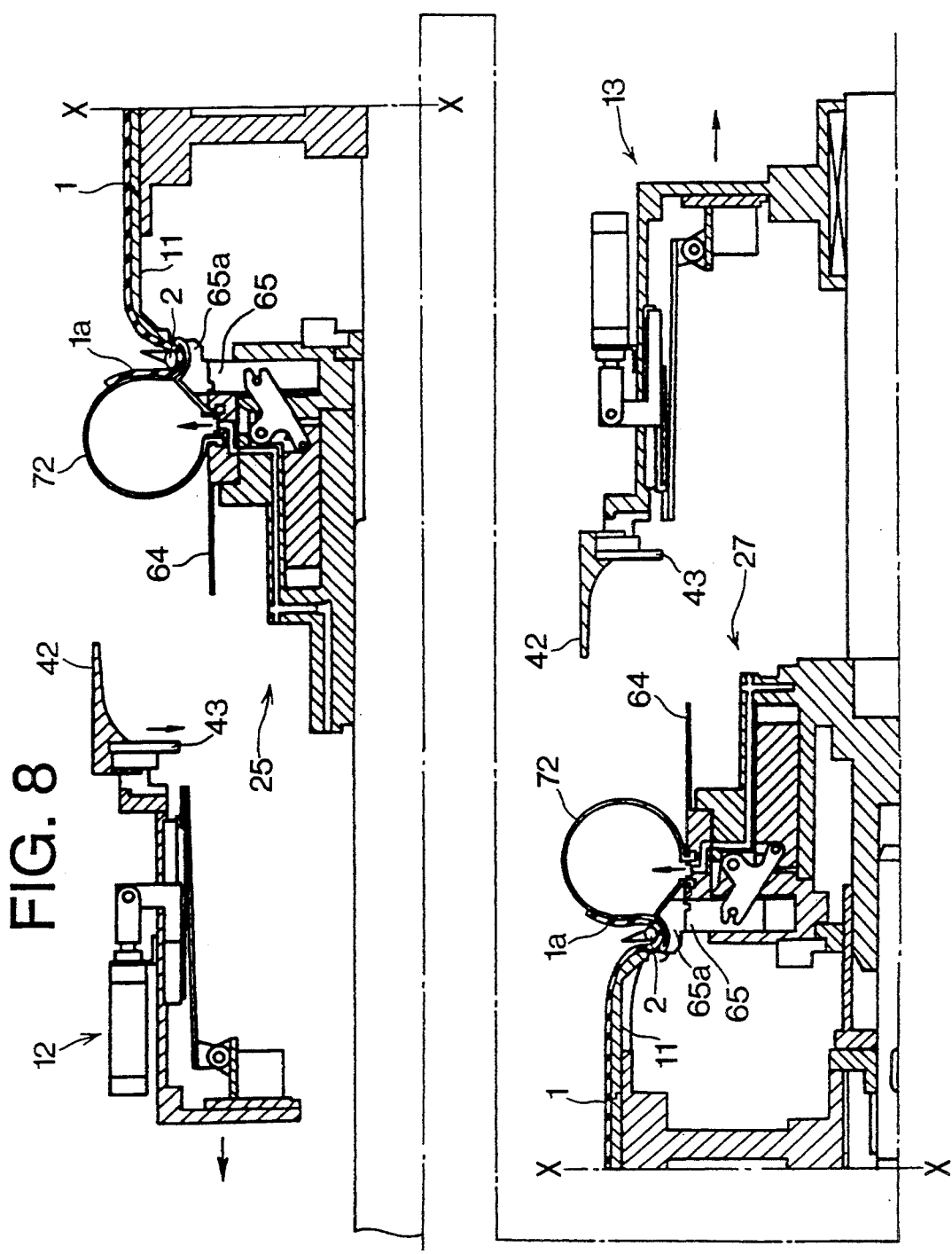
FIG. 8 is a partial side sectional view of the band forming machine showing the swelling of the folding bladder.
Figure 9:
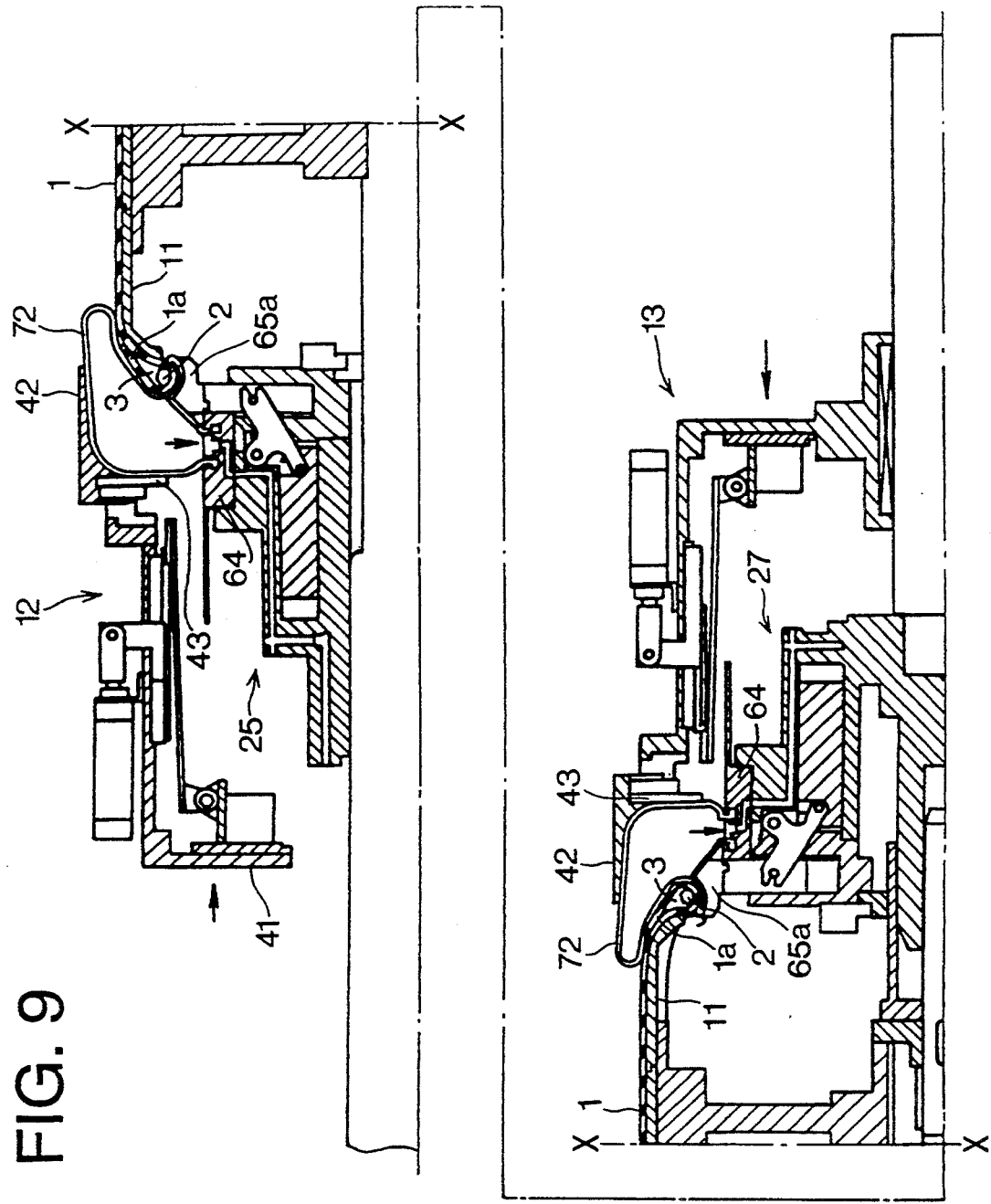
FIG. 9 is a partial side sectional view of the band forming machine showing the wrapping of the bead.
Figure 10:
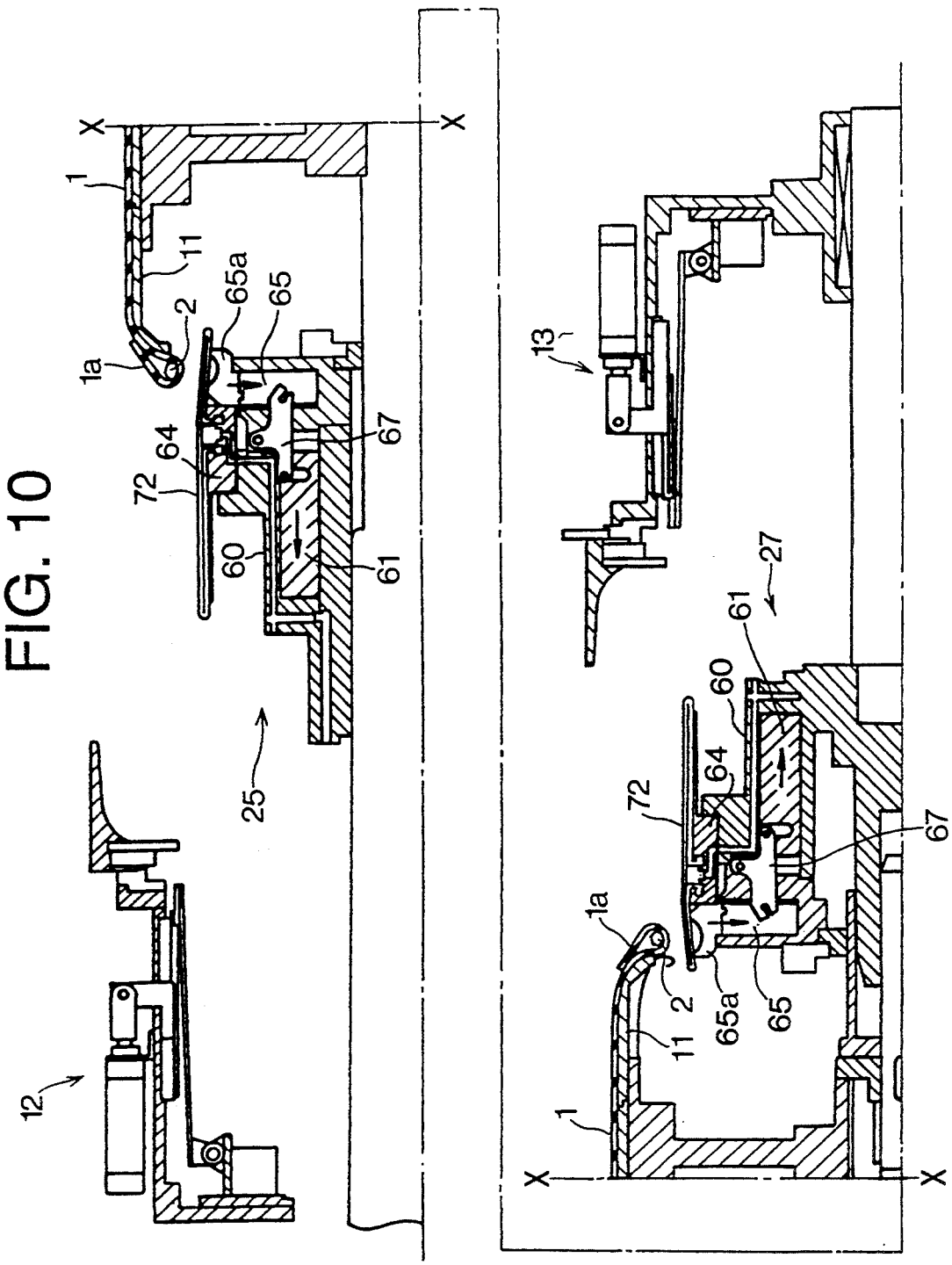
FIG. 10 is a partial side sectional view of the band forming machine showing the discharged bladder and removal of the positioning fingers and bead supports.
Figure 11:
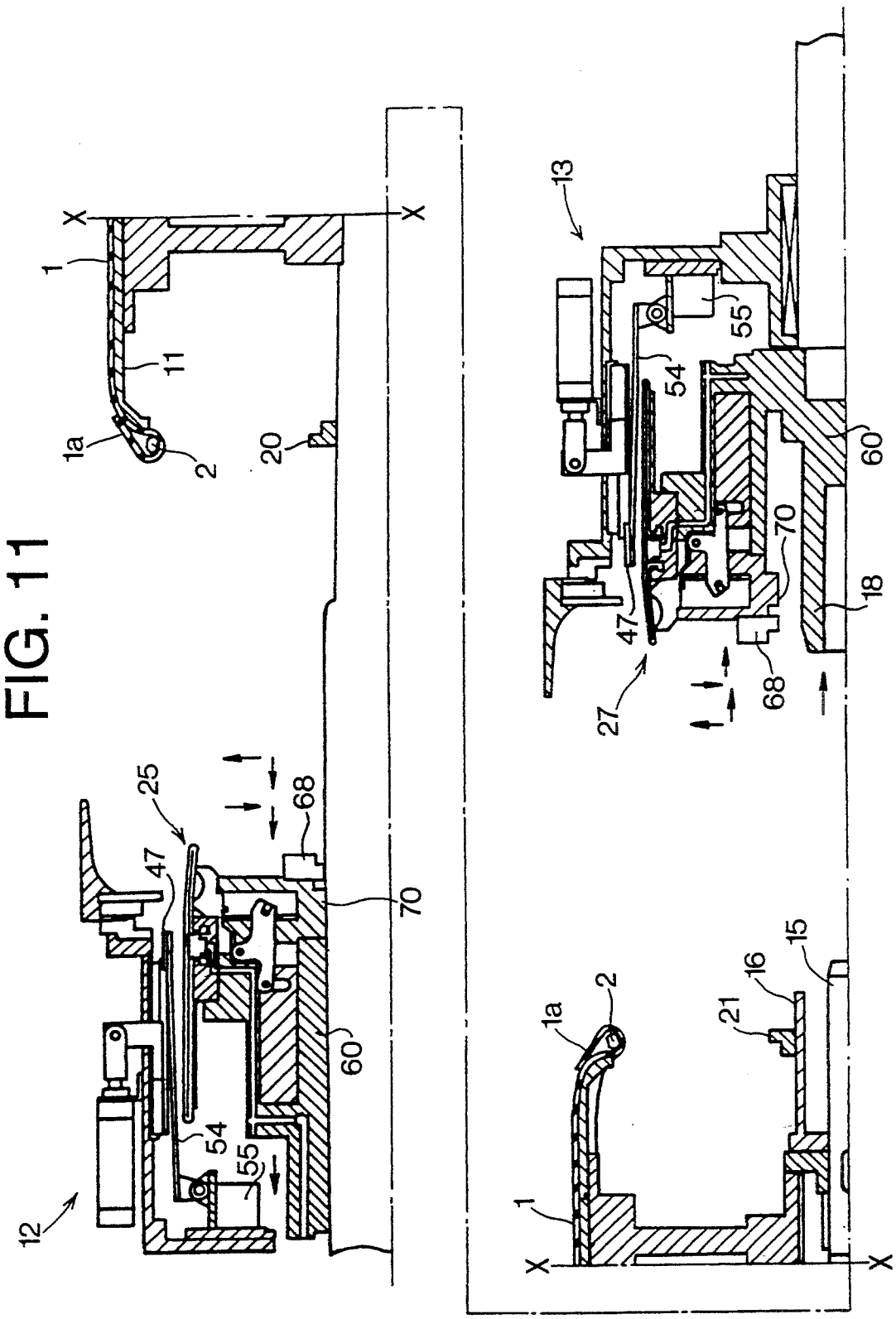
FIG. 11 is a partial side sectional view of the band forming machine showing the device returned to the initial stand-by position.
Figure 12:
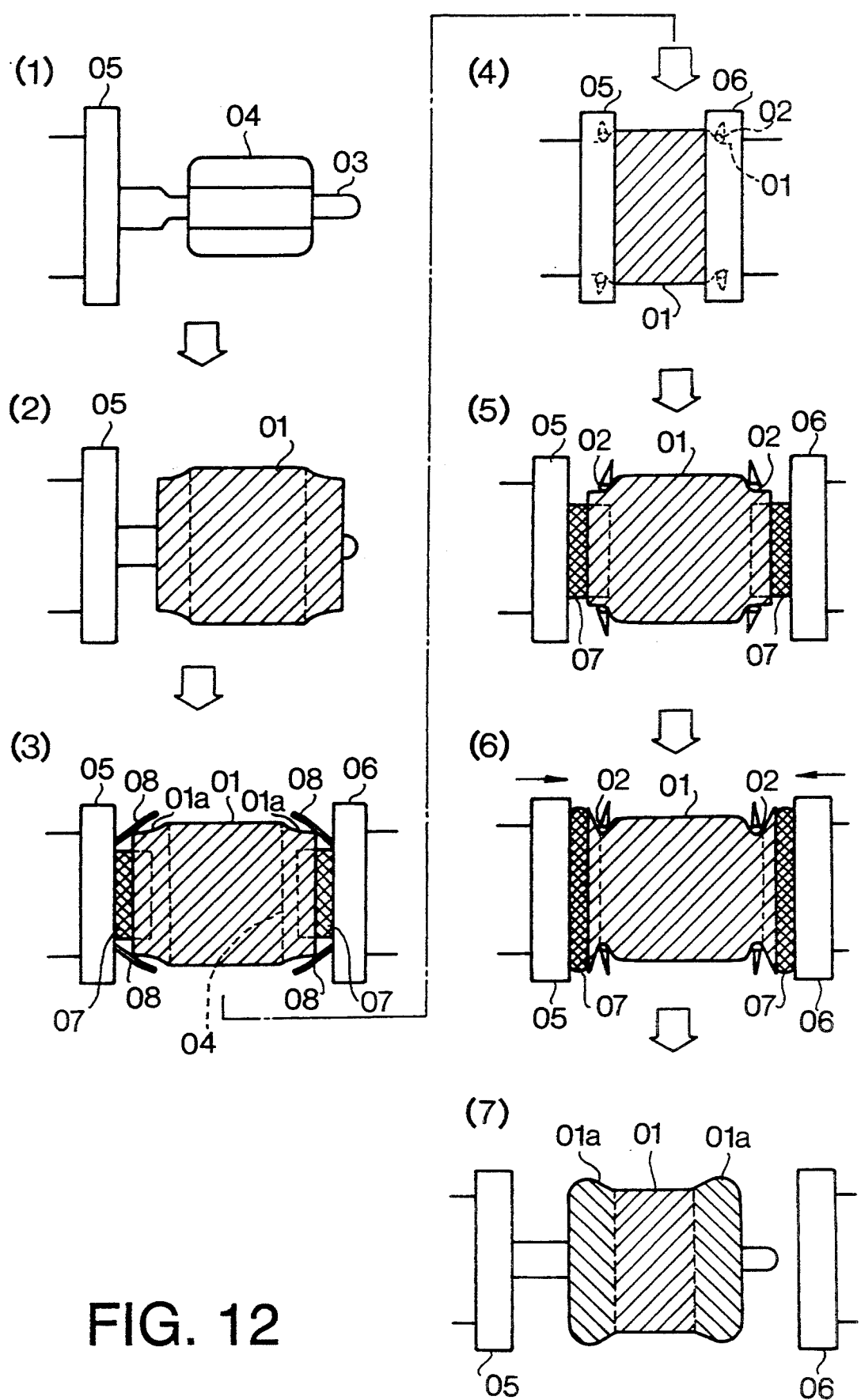
FIG. 12 is an explanatory view showing the operational procedure of the band forming machine in the related art.
Figure 13:
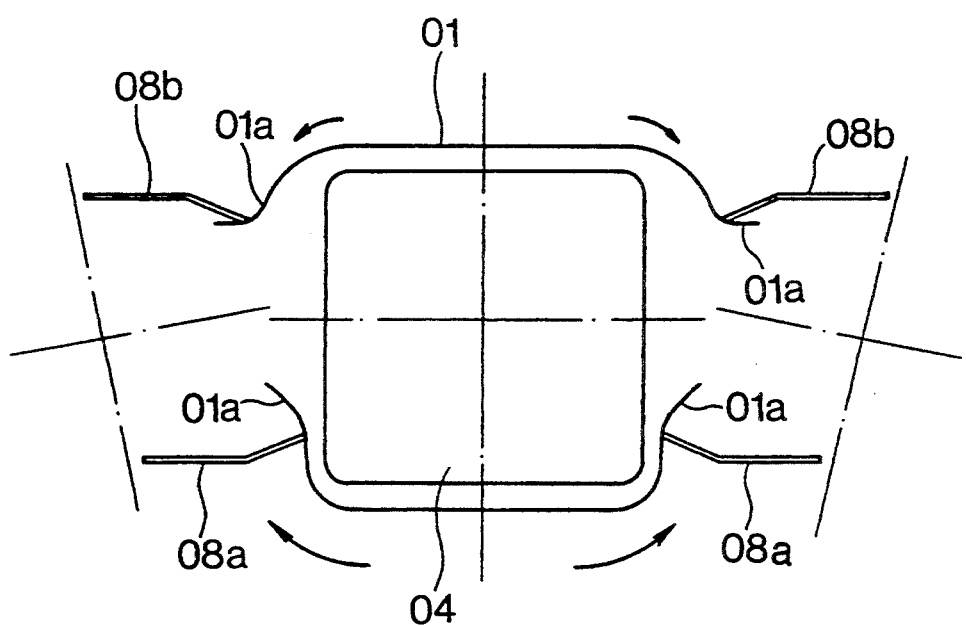
FIG. 13 is a schematic view for explaining the off-centered fingers.

Here, when the bead setters 12 and 13 advance, the bead locator ring 47 advances while pushing the outer surfaces of the fingers 54, so that the fingers 54 are gradually contracted, to squeeze the edge portion 1a of the band 1 (see FIG. 6). However, since the forming drum 11 supporting the band 1 is only expanded to the intermediate diameter, the squeeze amount of the edge portion 1a by the fingers 54 is made small, thereby reducing the generation of the wrinkling in the edge portion 1a.

The bead setters 12 and 13 are stopped when the bead 2 supported by the bead holders 43 and the bead locator rings 47 reaches the position corresponding to the bead supporting portions 65a of the bead lock segments 65 (see FIG. 6).

Next, by projecting the piston 61 from the air cylinder 60, the bead lock segments 65 are moved radially outwardly by the link member 67, so that the bead supporting portions 65a approaches to the bead 2 while placing a part of the folding bladder 72 on it. The fingers 54 and the bead locator ring 47 are retreated with a suitable timing, and substantially at the same time, the bead holders 43 are all rocked to be expanded in diameter as described above, and thereby the supporting of the bead 2 by the bead locator ring 47 and the bead holders 43 is released, and the bead 2 is supported by the recessed portions formed on the outer peripheries of the bead supporting portions 65a from the inner peripheral side through parts of the edge portion 1a of the band 1 and a folding bladder 72 (see FIG. 7).

The bead 2 is transferred to and supported by the bead supporting portion 65a in the state similar to the above-described one where the bead 2 is supported by the bead locator ring 47 and the bead holders 43, and in the transfer, the bead 2 hardly moves, so that it is accurately assembled at a specified position on the edge portion 1a. The folding bladder 72 and the edge portion 1a are fastened by the bead 2 upon the bead supporting portion 65a of the expanded bead lock segments 65 in such a manner as to bite at the recessed portions of the bead supporting portions 65a.

In such a state, the bead lock stopper 68 is once retreated radially outwardly, and the positioning state where they are abutted on the bead lock positioning stoppers 20 and 21 is released. Then, while the forming dram 11 is expanded up to the maximum diameter, each of the bead lock apparatuses 25 and 27 is advanced until the siding stopper 70 is abutted on each of the bead lock positioning stoppers 20 and 21. Thus, when the bead lock stopper 68 is returned to the radially inward position, each of the bead lock positioning stoppers 20 and 21 is held between the siding stopper 70 and the bead lock stopper 68, so that each of the bead lock apparatuses 25 and 27 is fixed at the specified position.

When the forming drum 11 is expanded to the maximum diameter, the edge portions 1a of the band 1 are drawn toward the center line X—X side along with the expansion of the drum, However, at the same time, the bead lock apparatuses 25 and 27 are moved to the center line X—X side, and thereby the beads 2 are moved together with the edge portions 1a, which prevents the assembling position of the beads 2 to the band 1 from being shifted, thus keeping the length of the band 1 between both the beads 2 and 2 constant.

Next, the bead setters 12 and 13 are retreated together with the fingers 54, and the bead holders 43 are contracted. Then, an air is supplied within the folding bladder 72 to swell the folding bladder 72 (see FIG. 8). The folding bladder 72 is largely erected outward, and the portion of the edge portion 1a which is located outside of the portion fastened by the bead 2 is largely expanded radially outwardly along the swelled bladder 72.

When the bead setters 12 and 13 advance in such a state that the folding bladder 72 is sufficiently swelled, the pusher can 42 at the leading edge and the bead holders 43 press the swelled folding bladder 72, so that the bladder 72 is deformed while suitably discharging air. Since the bladder 72 is suppressed in its swelling in the radially outward direction by the pusher can 42, it is swelled and deformed along the outer peripheral surface of the band 1, to thus fold the edge portion 1a expanded as described above on the outer surface of the band 1 while wrapping the bead 2 and the stiffener 3 on the inner side (see FIG. 9).

Next, the bead setters 12 and 13 are retreated again, and the air in the folding bladder 72 is perfectly discharged, so that the bladder 72 is laid down on the bladder supporting portion 64. Thus, when the piston 61 of the air cylinder 60 is drawn, the bead lock segments 65 are radially inwardly moved by the link member 67, and the bead supporting portion 65a for supporting the bead together with the bladder 72 is contracted while placing a part of the bladder 72 thereon, and thereby the bladder 72 is separated from the edge portion 1a. The band 1 keeps the state where the bead 2 is wrapped by the folded edge portion 1a (see FIG. 10).

Next, the bead lock stopper 68 is once radially outwardly moved, and each of the bead lock apparatuses 25 and 26 is retreated to release the fixing state of each of the bead lock apparatuses 25 and 26 by each of the bead lock positioning stoppers 20 and 21. After that, the bead lock stopper 68 is returned to the original position, and subsequently each of the bead lock apparatuses 25 and 26 is retreated to be returned to the original stand-by positions (see FIG. 11).

Then, the bead locator ring 47 advances, and the fingers 54 advance until the stopper 55 is abutted on the air cylinder 60, so that the apparatuses other than the forming drum 11 are returned to the initial stand-by states.

After that, the forming drum 11 is contracted to the minimum diameter, to remove the band 1, and a new band is supported on the forming drum 11. Then, new beads are mounted on the angular portion formed between the bead holders 43 and the bead locator ring 47, and thus the band forming is performed in the same procedure as described above.

In the above-described embodiment, the fingers 54 are positioned at the specified positions by allowing the stoppers 55 to be abutted on the bead lock apparatuses 25 and 27 positioned by the bead lock positioning stoppers 20 and 21, so that the edge portions 1a of the band 1 are uniformly squeezed over the whole circumference.

Further, when the bead 2 is assemled in the edge portion 1a, the bead supporting portion 65a is expanded and receives the bead 2, so that the motion of the bead 2 is made small, and the bead 2 can be accurately positioned at the specified position of the edge portion 1a.

In addition, when the forming drum 11 is expanded to the maximum diameter, the bead lock apparatuses 25 and 27 are brought close to the forming drum side, so that the shifting of the assembling positions of the beads 2 is prevented.

When the folding bladder 72 is swelled, each of the bead lock apparatuses 25 and 27 is fixed at the specified position by holding each of the bead lock positioning stoppers 20 and 21 between the siding stopper 70 and the bead lock stopper 68, and further, the expanded supporting portion 65a supports the bead 2 while putting a part of the edge portion 1a and the folding bladder 72 intermediately for firmly fixing the portion. Accordingly, the folding of the edge portion 1a by the folding bladder 72 can be securely performed.

By the assembling the beads at the specified positions, and by accurately folding the bead edge portions, it is possible to form the band with high quality and to improve the uniformity of the tire.

What is claimed is:

1. A method of forming a ring-like band having folded portions where beads are wrapped at both edges comprising:
    contracting in diameter a forming drum capable of being changed in diameter, and disposing a ring-like band around said forming drum;
    expanding said forming drum to an intermediate diameter, and supporting said band around said forming drum such that edge portions of said band project from ends of said forming drum;
    positioning bead lock segments capable of being changed in diameter at axial positions on inner sides of said edge portions;
    positioning fingers, which are disposed circumferentially around the forming drum and can be expanded/contracted, at positions outside said edge portions in an expanded state;
    contracting said fingers for reducing the diameters of said edge portions from the intermediate diameter of said forming drum to a diameter substantially equal to the diameter of the beads;
    positioning the beads at positions outside said edge portions and corresponding to said bead lock segments;
    expanding said bead lock segments to support said beads together with said edge portions from the inner sides, thereby assembling said beads and said band;
    expanding said forming drum to a maximum diameter, and simultaneously moving said bead lock segments toward said forming drum while supporting said beads; and
    swelling a folding bladder and folding said edge portions over an outer peripheral surface of said band, thereby wrapping said bead.

* * * * *